(12) United States Patent
Klemets

(10) Patent No.: US 7,644,175 B2
(45) Date of Patent: Jan. 5, 2010

(54) CLIENT-TO-SERVER STREAMING OF MULTIMEDIA CONTENT USING HTTP

(75) Inventor: Anders E. Klemets, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 12/061,033

(22) Filed: Apr. 2, 2008

(65) Prior Publication Data

US 2008/0189430 A1 Aug. 7, 2008

Related U.S. Application Data

(62) Division of application No. 10/610,988, filed on Jun. 30, 2003, now Pat. No. 7,392,316.

(51) Int. Cl.
*G06F 15/16* (2006.01)

(52) U.S. Cl. .................. 709/231; 709/203; 709/227; 709/228; 709/229; 709/236; 709/237

(58) Field of Classification Search ............. 709/203, 709/227–229, 231, 236, 237
See application file for complete search history.

(56) References Cited

U.S. PATENT DOCUMENTS

| | | | |
|---|---|---|---|
| 5,778,174 A * | 7/1998 | Cain ......................... 726/11 |
| 6,041,345 A | 3/2000 | Levi et al. |
| 6,260,083 B1 | 7/2001 | Moore et al. |
| 6,292,834 B1 | 9/2001 | Ravi et al. |
| 6,389,422 B1 | 5/2002 | Doi et al. |
| 6,397,246 B1 | 5/2002 | Wolfe |
| 6,397,259 B1 | 5/2002 | Lincke et al. |
| 6,415,313 B1 * | 7/2002 | Yamada et al. ............. 709/200 |
| 6,654,796 B1 | 11/2003 | Slater et al. |
| 6,874,084 B1 * | 3/2005 | Dobner et al. ............. 713/156 |
| 6,892,240 B1 * | 5/2005 | Nakajima .................. 709/227 |
| 7,003,798 B2 * | 2/2006 | Yamakawa et al. .......... 726/11 |
| 7,003,799 B2 | 2/2006 | Jorgenson |
| 7,216,172 B2 | 5/2007 | Yang et al. |
| 7,225,249 B1 * | 5/2007 | Barry et al. ................ 709/227 |
| 7,392,316 B2 * | 6/2008 | Klemets .................... 709/227 |
| 7,408,926 B1 * | 8/2008 | Moeck et al. .............. 370/352 |
| 7,409,454 B2 * | 8/2008 | Wynn et al. ................ 709/228 |

(Continued)

OTHER PUBLICATIONS

Lee, et al., "Hypertext Transfer Protocol HTTP/1.0", at http://www.w3.org/Protocols/rfc1945/rfc1945, RFC, May 1996, pp. 1-57.

*Primary Examiner*—Alina N. Boutah
(74) *Attorney, Agent, or Firm*—Merchant & Gould P.C.

(57) ABSTRACT

Systems and methods are described for streaming multimedia data from a client to a server using HyperText Transfer Protocol (HTTP). A session is initiated with a header that identifies a content length header that is a maximum allowed by the server, regardless of the actual length of the data to be streamed. If a firewall or proxy server limits access to the server, the content length of the data is specified to be about an amount of data that can be streamed to the server in one minute. If more data remains to be streamed when an amount of data approximating the content length has been streamed, a continuing streaming session is requested and subsequent data is streamed to the server in the continuing streaming session. The process repeats until all data has been streamed.

17 Claims, 6 Drawing Sheets

U.S. PATENT DOCUMENTS

| | | |
|---|---|---|
| 2001/0029525 A1 | 10/2001 | Lahr |
| 2002/0007338 A1* | 1/2002 | Do .............................. 705/37 |
| 2002/0078198 A1* | 6/2002 | Buchbinder et al. ......... 709/224 |
| 2002/0104022 A1* | 8/2002 | Jorgenson ................... 713/201 |
| 2002/0120760 A1* | 8/2002 | Kimchi et al. .............. 709/230 |
| 2002/0161853 A1 | 10/2002 | Burak et al. |
| 2002/0198943 A1 | 12/2002 | Zhuang et al. |
| 2003/0005139 A1 | 1/2003 | Colville et al. |
| 2003/0051142 A1* | 3/2003 | Hidalgo et al. .............. 713/176 |
| 2003/0225889 A1* | 12/2003 | Moutafov ................... 709/227 |
| 2003/0236906 A1 | 12/2003 | Klemets et al. |
| 2003/0236907 A1 | 12/2003 | Stewart et al. |
| 2003/0236912 A1 | 12/2003 | Klemets et al. |
| 2004/0003101 A1* | 1/2004 | Roth et al. ................... 709/231 |
| 2004/0030788 A1 | 2/2004 | Cimo et al. |
| 2004/0125757 A1* | 7/2004 | Mela et al. ................... 370/261 |
| 2004/0199665 A1 | 10/2004 | Omar et al. |
| 2004/0205149 A1 | 10/2004 | Dillon et al. |
| 2004/0249951 A1* | 12/2004 | Grabelsky et al. ........... 709/227 |
| 2004/0255008 A1* | 12/2004 | Olsen et al. ................. 709/220 |
| 2005/0044242 A1 | 2/2005 | Stevens et al. |
| 2006/0031407 A1* | 2/2006 | Dispensa et al. ............ 709/219 |
| 2006/0064500 A1* | 3/2006 | Roth et al. ................... 709/231 |
| 2008/0046585 A1 | 2/2008 | Blumofe |

* cited by examiner

Exemplary Methodological Implementation - Encoder

Exemplary Methodological Implementation - Encoder (cont'd)

Exemplary Communication Between Encoder and Server

CLIENT-TO-SERVER STREAMING OF MULTIMEDIA CONTENT USING HTTP

RELATED APPLICATION

This application is a divisional of and claims priority to U.S. patent application Ser. No. 10/610,988, filed on Jun. 30, 2003 now U.S. Pat. No. 7,392,316, the disclosure of which is incorporated by reference herein.

TECHNICAL FIELD

This invention relates to streaming media and data transfers, and particularly to streaming multimedia content from a client to a server using HyperText Transfer Protocol (HTTP).

BACKGROUND

HyperText Transfer Protocol (HTTP) was designed for browsing networks—such as the Internet—and not for delivery of streaming media. However, widespread support for HTTP in firewalls and proxy servers, has triggered the development of various ways for delivering streaming media using HTTP. By using HTTP, the streaming media data can traverse firewalls that might be blocking other streaming media networking protocols.

Typically, a media player will establish an HTTP connection to a media server through a firewall or proxy server. The server's response to the HTTP request contains the streaming media data. The streaming media data always flows to the entity that made the initial HTTP request, i.e., the client.

Sometimes it is desirable to stream content from a client to a server. This is the case when multimedia data is assembled at a client and uploaded to a server for access at the server or for distribution to other servers and/or clients. The problem is that HTTP only supports streaming from a server to a client, and not vice-versa.

A typical approach to dealing with this problem is to reverse the roles of client and server and have a server initiate a streaming session with a client. In such a scenario, the server acts as a media player and the client acts as a media server. The multimedia content may then stream from the client to the server.

A problem with this technique occurs when such client to server streaming is attempted over connections that utilize a firewalls or a proxy server. Such devices usually block incoming connections from reaching the server.

Another problem with attempts to stream content from a client to a server is that HTTP requires that the size of data that is sent must be specified in advance. However, an encoder does not usually know the size of the data in advance and cannot provide this information.

SUMMARY

Client to server streaming of multimedia content data using HyperText Transfer Protocol (HTTP) is described herein.

The problems mentioned above are overcome by a client initiating an HTTP session with a server and sends the streaming multimedia content encapsulated inside the message body of an HTTP "POST" request. The use of HTTP and the fact that the client is initiating the connection allows the client to traverse firewalls or proxy servers that may be separating the client from the network or server.

Since the client may not know the size of the data before sending the "POST" request, a content length of a particular size is denoted. The size denoted by the content length varies depending on whether a firewall or proxy server is present between the client and the server.

If no firewall or proxy is present, a maximum content length is specified. If the data is less than the specified content length, then the client simply terminates the streaming session. If the data is greater than the specified content length, one or more additional "POST" requests are issued to tack subsequent data to previously streamed data.

If there is a firewall or proxy server between the client and the server, a content length equaling approximately one minute of data transmission is specified. A new "POST" request is sent about every minute.

BRIEF DESCRIPTION OF THE DRAWINGS

The same numbers are used throughout the document to reference like components and/or features.

FIG. 4b is a continuation of the flowchart depicting an exemplary methodological implementation of an encoder process shown in FIG. 4a.

DETAILED DESCRIPTION

Exemplary Network Environment

Figure 1:
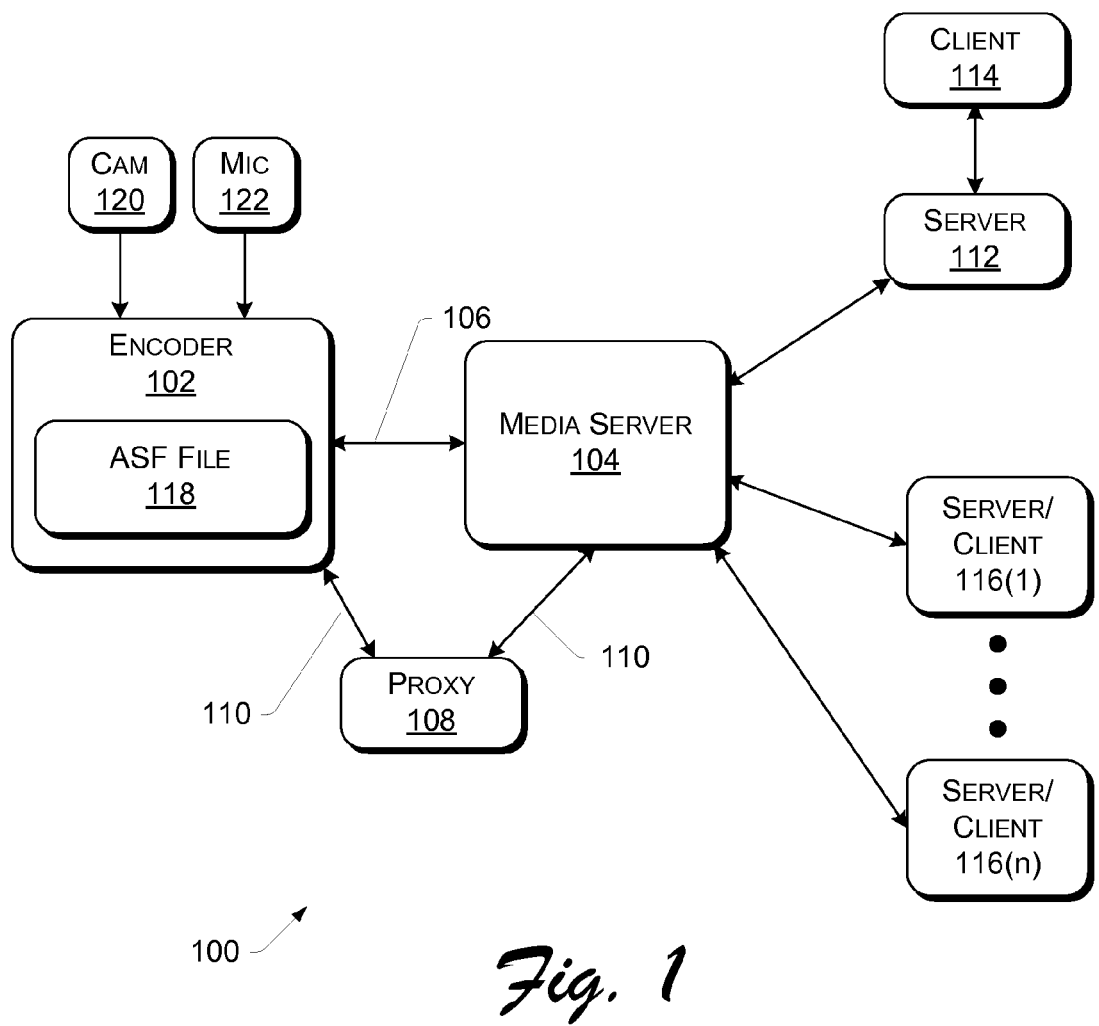
FIG. 1 illustrates an exemplary network environment.

FIG. 1 illustrates an exemplary network environment 100. The exemplary network environment includes an encoder 102 (i.e. client) that communicates with a media server 104 over communication channel 106, which may include a network connection such as an Internet connection. The encoder 102 may also communicate with the media server 104 through a proxy server 108 or firewall (not shown) via communication channels 110, which may include a network connection such as an Internet connection.

The exemplary network environment 100 also includes a server 112 that receives data from the media server 104 and a client 106 that receives data from the server 112. Several other server/client devices 116(1) through 116(n) are shown and represent other devices that may send and/or receive data to/from the media server 104.

Server 112, client 114 and server/client devices 116(1)-116(n) can each be any of a variety of conventional computing devices, including desktop PCs, workstations, mainframe computers, Internet appliances, gaming consoles, handheld PCs, cellular telephones, personal digital assistants (PDAs), etc. One or more of devices (server 112, client 114, and server/client devices 106(1)-106(n)) can be the same types of devices, or alternatively different types of devices.

The media server 104 can make any of a variety of data available for streaming to clients (encoder 102, client 114, and client/servers 116) and/or other servers (server 112, client/servers 116). The term "streaming" is used to indicate that the data representing the media is provided over a network to a client device and that playback of the content can begin prior to the content being delivered in its entirety (e.g., providing the data on an as-needed basis rather than pre-delivering the data in its entirety before playback). The data may be publicly available or alternatively restricted (e.g., restricted to only certain users, available only if the appropriate fee is paid, etc.). The data may be any of a variety of one or more types of content, such as audio, video, text, animation, etc. Additionally, the data may be pre-recorded or alternatively "live" (e.g., a digital representation of a concert being captured as the concert is performed and made available for streaming shortly after capture).

Furthermore, as will be discussed in greater detail below, multimedia data may also be streamed from the encoder 102 to the media server 104.

Multimedia data is represented in the encoder 102 as an Advance System Format (ASF) file 118. ASF is a format for storing coordinated multimedia data and can deliver data over a wide variety of networks. ASF is also strongly suited for local playback applications. The ASF file 118 will be discussed in greater detail below in relation to the systems and methods described herein. However, it is noted that another format may be used without departing from the scope of the appended claims. Those skilled in the art will recognize any variations in the described implementations that may be necessary to adapt the implementations to utilize another file format.

The ASF file 118 may be created and stored from input devices such as a camera 120, which produces a video stream, and a microphone 122, which produces an audio stream. However, it is noted that the ASF file 118 may be stored in the encoder 102 as a result of any other method, such as transferring the ASF file 118 to the encoder 102 from another device.

Exemplary Client and Server Devices

Figure 2:
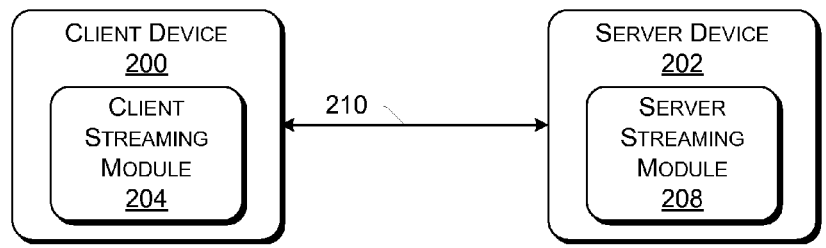
FIG. 2 illustrates exemplary client and server devices.

FIG. 2 illustrates an exemplary client device 200 and an exemplary server device 202. The client device 200 (which is similar to the encoder 102 of FIG. 1) includes a client streaming module 204 configured to communicate with a server streaming module 206 of the server device 202. A HyperText Transport Protocol (HTTP) version 1.1 (HTTP 1.1) connection 210 is established between the client device 200 and the server device 202, allowing data and control information to be passed between client streaming module 204 and the server streaming module 206. Although not shown in FIG. 2, one or more additional devices (e.g., firewalls, routers, gateways, bridges, etc.) may be situated between the client device 200 and the server device 202. Once established, connection 210 remains open, allowing commands to continue to be sent from the client device 200 to the server device 202 (rather than to some other server device). By leaving the connection 210 open, commands to navigate through the media being streamed can be communicated from the client device 200 to the server device 202, as discussed in more detail below.

HTTP and ASF Format/Syntax

Figure 3A:
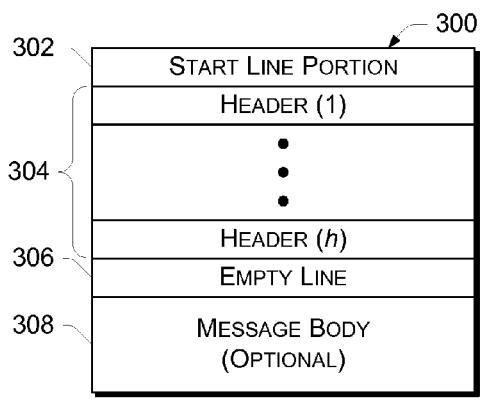
FIG. 3a illustrates an exemplary HTTP message format.

FIG. 3a illustrates an exemplary HTTP 1.1 message format. The data structure 300 of an HTTP 1.1 message includes a start line field or portion 302, one or more header fields or portions 304, an empty line field or portion 306, and an optional message body field or portion 308. Start line portion 302 contains data identifying the message or data structure type, which can be either a request-line (e.g., for an HTTP 1.1 "POST" request) or a status-line (e.g.: for an HTTP 1.1 "200 OK" response) One or more headers 304 are also included that contain data representing information about the message. An empty line portion 306 is used to identify the end of the headers 304. Additional data may optionally be included in message body portion 308.

Although the present discussion references HTTP version 1.1, it is noted that HTTP version 1.0 may also be used in one or more implementations. However, when using HTTP 1.0, a "Connection: Keep-Alive" header must be sent in a request to keep a connection open between requests. Such a header is not required when using HTTP 1.1 and, therefore, will not be discussed in any further detail.

As previously mentioned, the present examples utilize the ASF format. FIG. 3b illustrates an exemplary ASP file format. An ASF file 350 is shown that includes a file header 352 followed by several data packets 356(1)-356(n) of multimedia data. The data packets 356 (i.e. data frames) contain data for one or more media streams that are carried by the ASF file 350. The file header 352 specifies properties of all entire file ("file properties" 354), along with stream-specific properties ("stream properties" 355). The data packets 356 reference a particular media stream number to indicate its type and purpose. The delivery and presentation of all media stream data is aligned to a common timeline.

ASF is a multimedia presentation file format. It supports live and on-demand multimedia content. ASF files may be edited, but ASP is specifically designed for streaming and/or local playback.

ASF files are logically composed of three types of top-level objects: a header object, a data object and an index object. The header object is mandatory and must be placed at the beginning of every ASF file. The data object is also mandatory and must follow the header object. The index object(s) (not shown) is/are optional but are useful in providing time-based random access into ASF files.

The following descriptions will focus on a file header object and file data objects and may be referred to simply as a header and one or more data packets. Although shown in one or more simplified diagrams, below, the header object and file data objects shown comport with ASF specifications ©2001-2003 MICROSOFT CORP.

Figure 3C:
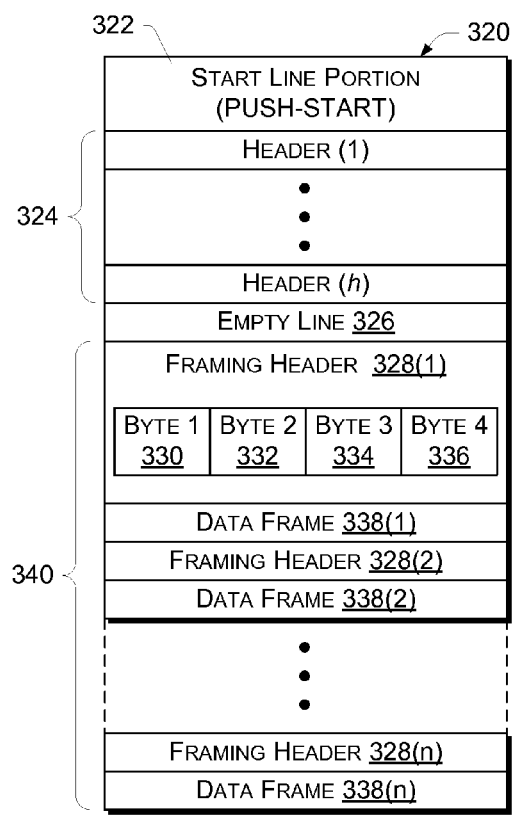
FIG. 3c illustrates an exemplary ASF file format.
Figure 3B:
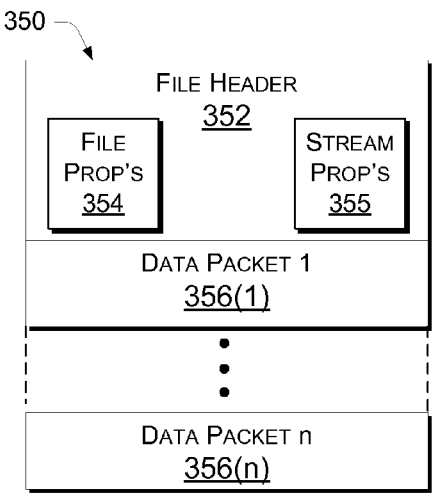
FIG. 3b illustrates an exemplary ASF file format.

FIG. 3c is an exemplary HTTP message format for streaming contents of an ASF file similar to the ASF file 350 shown in FIG. 3b. A start line portion 322 indicates that the message is a "push start" request. A header portion 324 includes multiple headers (1-h). An empty space 326 follows the header portion 324, and is subsequently followed by a four-byte framing header 328(1). The framing header 328(1) is a part of a new corresponding data frame 338(1), the contents of which depend on the values included in the framing header 328(1).

The format of the four-byte framing header 328(1) is described below.

Byte 1 330 of the framing header 328(1) contains the ASCII code for the dollar sign character ("$"). Byte 2 332 of the framing header 328(1) contains a data type code. The data type codes are:

"H"—ASF file header
"D"—ASF data packet
"F"—Padding (fill) packet
"E"—End-of-Stream indication
"C"—Change-of-Stream indication Byte 3 334 of the framing header 328(1) is a first data length field that contains the least significant eight (8) bits of the data length. Byte 4 336 of the framing header 328(1) is a second data length field that contains the most significant eight (8) bits of the data length.

Additional framing headers 328(2)-328(n) and data frames 338(2)-338(n) may be included after the framing header 328 (1) and data frame 338(1). The framing headers 328 and the data frames 338 make up a message body 340 (see message body 308 of FIG. 3a).

It is noted that the particular example or examples shown and described herein do not preclude the practice of inserting additional headers after the framing header. Although not explicitly shown that way here, the practice is acceptable as long as the encoder and the server agree that such additional headers may be present.

As previously mentioned, all HTTP "POST" requests must carry a "Content-Length" header. The purpose of this header is to specify the size of the message body, in bytes. However, in the case of the "push start" request, the size of the message body is not necessarily known in advance. This is especially true when the encoder/client is used to encode/transmit a live session.

The elements and functions of FIGS. 1-3 will be discussed in greater detail, below, with respect to one or more exemplary methodological implementations of the systems and methods described herein.

Exemplary Methodological Implementation—Encoder

Figure 4A:
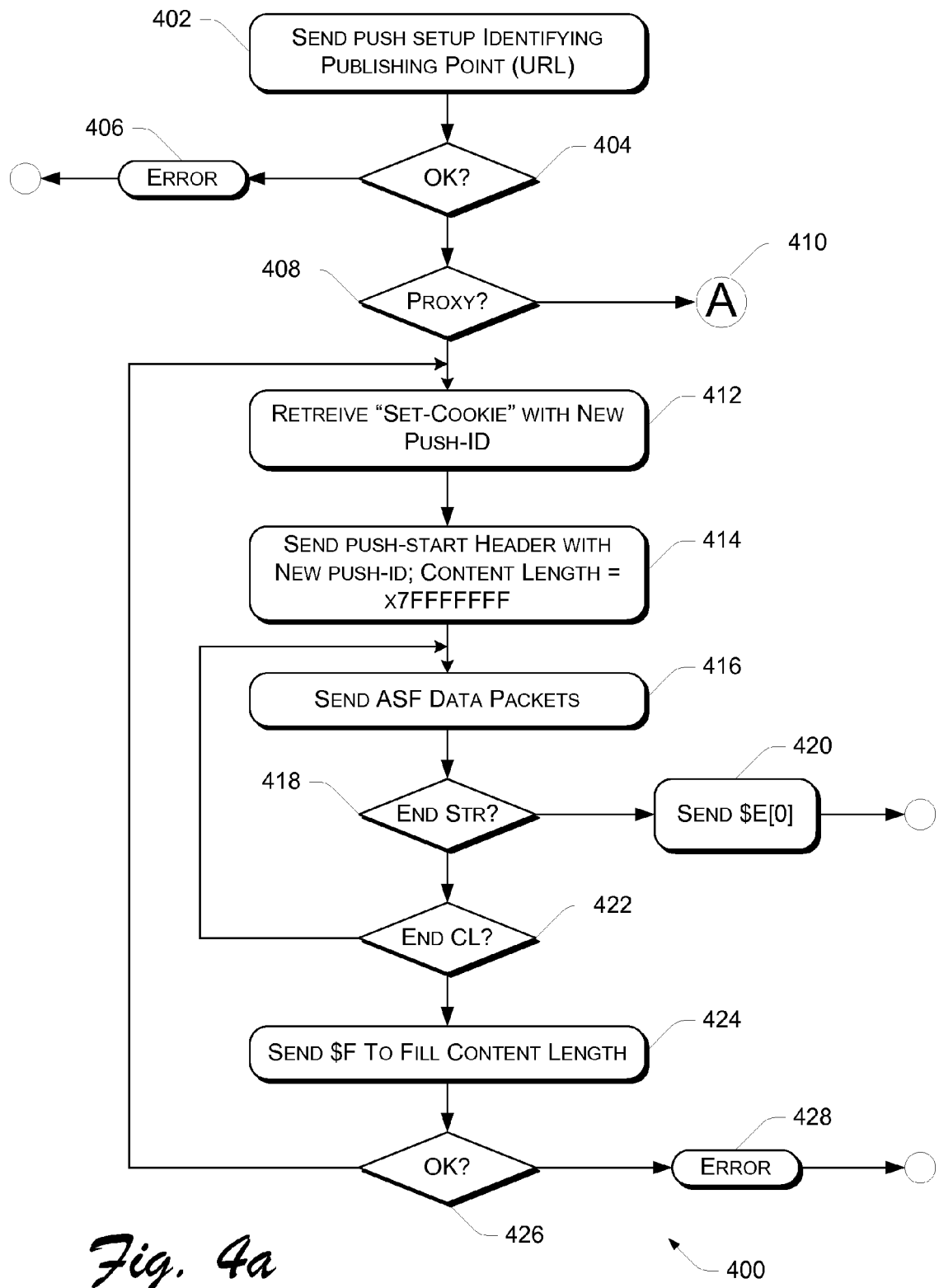
FIG. 4a is a flowchart depicting an exemplary methodological implementation of an encoder process.

FIG. 4a is a flow diagram 400 depicting an exemplary methodological implementation of an encoder process. In the following discussion, continuing reference will be made to features and reference numeral shown in the preceding figures.

Figure 4B:
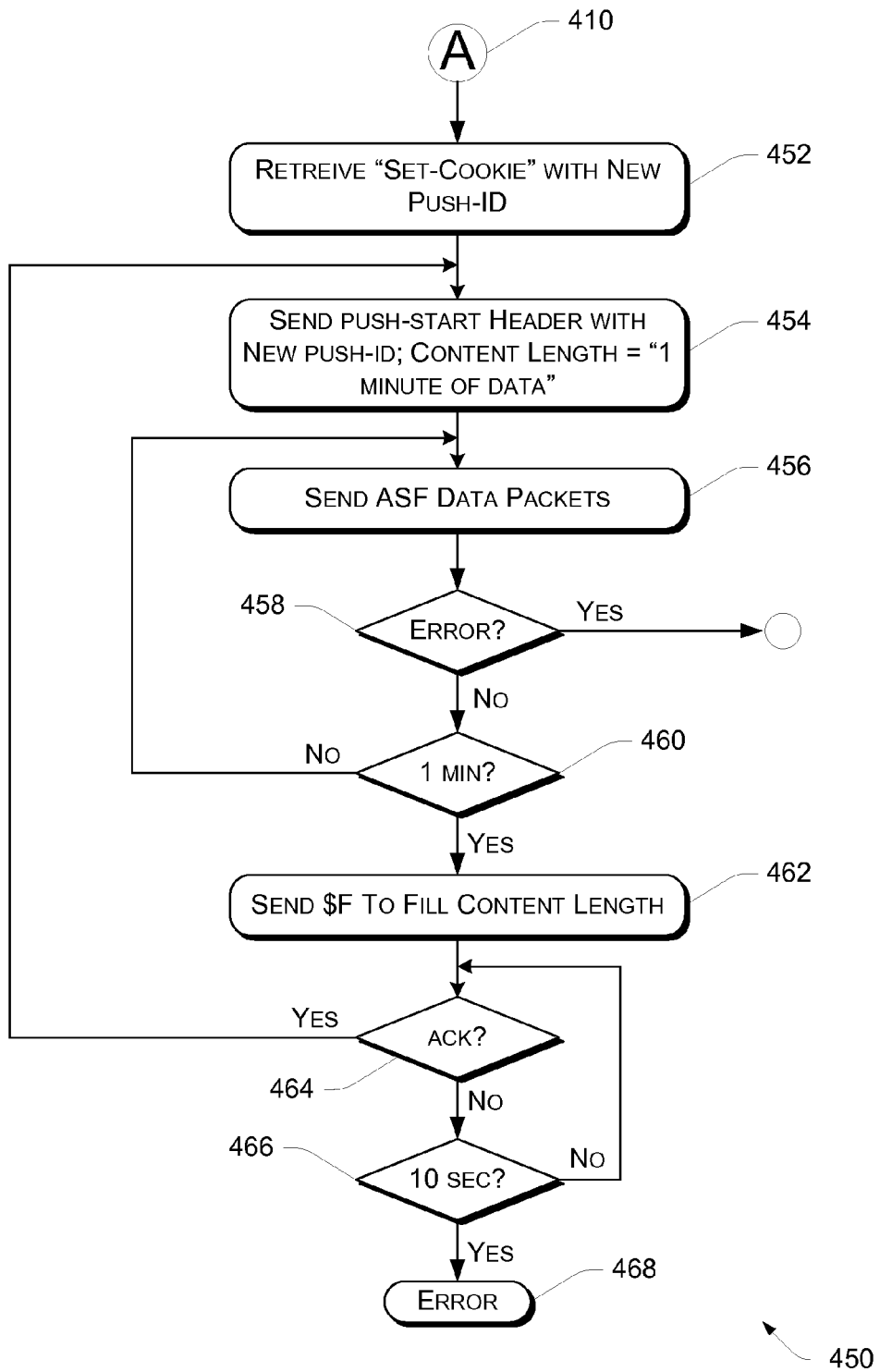

It is noted that the process depicted in FIG. 4a is an exemplary methodological implementation of an encoder process when there is no firewall or proxy detected between an encoder and a server. FIG. 4b, following, is an exemplary methodological implementation of an encoder process when there is firewall or proxy detected between an encoder and a server (including blocks 402-410 of FIG. 4a).

At block 402, the encoder 102 (FIG. 1) uses HTTP to connect to the media server 104, traversing any firewalls or proxy servers 108 in the process. A "push setup" request is transmitted to the media server 104 that assigns a logical name, called a "publishing point" to the data that will be streamed to the media server 104. The encoder 102 refers to the publishing point using a regular HTTP URL (Universal Resource Locator).

The "push setup" request is identified as such through the following HTTP header: Content-Type: application/x-wms-pushsetup.

The media server 104 will attempt to validate the "push setup" request. For example, if the requested publishing point does not exist, the media server 104 will determine if the encoder 102 is authorized to create the publishing point. If the publishing point already exists and is use by another encoder/client, then the media server 104 will deny the request. If the publishing point is not in use and was created by the encoder 102 or anonymous encoder, then the publishing point is authorized. If the publishing point is not in use but was created by another encoder (not anonymous), then the request will be denied.

Additionally, when the encoder 102 presents the "push-setup" request, the encoder 102 may provide the name of another, existing publishing point to use as a template. The media server 104 will use the template publishing point as a model when creating the new publishing point, copying settings from the existing publishing point, such as bandwidth limits, etc.

At this time, the encoder 102 may also specify whether or not the publishing point should be automatically deleted once the streaming media session is over.

The name of the template publishing point and the request to automatically delete the publishing point are carried inside the "message body" 308 (FIG. 3a) of the HTTP message 300. If neither of these features is utilized, then the "message body" 308 is empty.

Usually, for the media server 104 to determine if the encoder 102 is authorized to create a publishing point or to stream data to an existing publishing point, the encoder 102 must be authenticated. The media server 104 can do this by sending an authentication challenge to the encoder 102 using standard HTTP mechanisms (e.g. by sending a "401 Unauthorized" response and including an authentication challenge using a specific authentication package, such as "Basic," "Digest" or "NTLM."

If the "push setup" request is denied ("No" branch, block 404), then an error message is generated and sent to the encoder 102 at block 406. The streaming, then, will not be allowed.

If the media server 104 accepts the "push setup" request ("Yes" branch, block 404) then the media server 104 sends a regular HTTP "200 OK" response. The response contains a "Set-Cookie" header that tells the encoder 102 to remember a cookie called "push-id." The value of this cookie is a numeric identifier that the encoder 102 will use in a subsequent request.

No Proxy/Firewall Present

If there is a firewall or proxy 108 present between the encoder 102 and the media server 104 ("Yes" branch, block 408), then the process continues at block 410 (continuation "A") and will be discussed further with respect to 4b below.

If there is not a firewall or proxy 108 present between the encoder 102 and the media server 104 ("No" branch, block 408), then the process continues at block 412, where the "Set-Cookie" header with the "push-id" is received by the encoder 102.

At block 414b the encoder 102 formulates a second "POST" request—a "push-start" request—and transmits it to the media server 104. The "push-start" request is sent using the same URL as the "push-setup" request but the "push-id" cookie that the media server 104 returned in the "push setup" response is included in the "push start" request (in place of the original "push-id" that was sent to the media server 104). This provides the media server 104 with a convenient way to relate the two "POST" requests with each other.

The "push-start" request is identified as such using the following HTTP header: Content-Type: application/x-wms/pushstart.

As previously stated, all HTTP "POST" requests must carry a "Content-Length" header. The purpose of this header is to specify the size of the message body, in bytes. In the case of the "push-start" request, the size of the message body is not necessarily known in advance, e.g. in the case of a live session.

Further (at block 404), the "Content-Length" header is set the decimal value 2,147,483,647 (hexadecimal x7FFFFFFF). This value is used because there are some "transparent" proxy servers that cannot be detected, and some such servers may not handle "POST" requests properly if the "Content-Length" header has a larger value. Furthermore, there is a similar limit in WINDOWS® systems.

At block 416, the encoder 102 begins to send the ASF data packets 356 to the media server 104. If and end of the data packets (i.e. data packet 356(n)) is reached ("Yes" branch, block 418), then and end-of-stream message (i.e. "$E[0]") is sent to the media server 104 at block 420 to let the media server 104 know that there will be no more data packets coming in the stream.

The data portion of the end-of-stream message is a 32-bit integer number. The number gives the reason for why the stream is ending. If the reason code is "1" it indicates a temporary pause in the data transmission. This reason code is used when changing the ASP file header. It is also used if the encoder 102 is temporarily paused, say, during an intermission in a live event.

The encoder 102 may even disconnect from the server 104 at this time. Any streaming media clients (media players) that are connected to the media server 104 and are receiving the streaming feed from the encoder 102 will not be disconnected. As long as the encoder 102 connects back to the media server 104 and sends a new "POST" request within five (5) minutes, the streaming media session can be resumed.

If the end-of-stream message contains a reason code of "0" it means that the streaming media session has ended normally. Any streaming media clients that are connected to the media server 104 and are receiving the encoder 102 feed will enter "Stopped" state. They will not display an error.

If the end-of-stream message contains a reason code that indicates an error, streaming media clients that are connected to the media server 104 and are receiving the encoder 102 feed will display an error dialog box indicating that an error has occurred.

As long as the end of the stream is not detected ("No" branch, block 418), the encoder 102 tracks the usage of the specified Content-Length. As long as the Content-Length is sufficient ("NO" branch, block 422), then the data packets will continue to be streamed at block 416.

If the end of the Content-Length is reached, or is nearing and cannot be utilized further ("Yes" branch, block 422) but the encoder 102 has more data to send, then the encoder 102 will send a special padding packet ("$F", see above) at block 424 to fill up any remaining unused portion of the Content-Length amount. This is because the HTTP "POST" request cannot be completed until the encoder 102 has sent exactly the amount that was specified in the Content-Length header.

After the Content-Length has been filled successfully ("Yes" branch, block 426), the "push start" request is complete, and the media server 104 will respond with a "200 OK" response and a new "push-id" cookie (block 412) and the process will repeat. This way, the encoder 102 can continue streaming data to the media server 104 in perpetuity by repeatedly sending HTTP "POST" requests.

If the media server 104 denies the new "push start" request because of some error ("No" branch, block 426's), then an error message is generated at block 428 and the process is terminated.

If an error were to occur at the media server 104, the media server 104 can fail an on-going HTTP "POST" request at any time, without waiting for the encoder 102 to send all of the data that was indicated in the Content-Length header. The media server 104 will send an HTTP response—such as "408 Request Timeout" to tell the encoder 102 why the request failed.

Proxy/Firewall Present

FIG. 4b is a flow diagram 450 that is a continuation of the flow diagram 400 depicted in FIG. 4a. The steps shown in FIG. 4b indicate different steps that the encoder 102 will execute in the event that the encoder 102 detects a proxy server and/or a firewall present in the communication channel between the encoder 102 and the media server 104. The process depicted in FIG. 4b begins with continuation "A" 410, also shown in the flow diagram 400 of FIG. 4a.

At block 452, the encoder 102 receives the "set-cookie" header from the media server 104 that contains the "push-id" to use subsequently.

When a proxy server 108 separates the encoder 102 and the media server 108, some proxy servers do not forward the HTTP response from the media server 104 if the media server 104 failed the "POST" request before the encoder 102 had sent all of the data indicated in the Content-Length header. More than two billion bytes is a very large amount of data, and depending on the streaming bit rate, it can take several hours, or days, to stream this amount of data. To make it possible for the encoder 102 to realize that something has gone wrong with the streaming session to the media server 104, a "push-start" header with the "push-id" is sent at block 454 and a Content-Length header includes a value that corresponds with approximately one (1) minute's worth of data at the encoder-server streaming rate.

This means that about one per minute, the encoder 102 needs to send a padding packet, wait for the "POST" response and then send a new "POST" request to the media server 104. If, for some reason, the media server 104 interrupted the streaming session and the proxy server 108 blocked the error response, the encoder 102 will still notice the problem when it completes the "POST" request alter—on average—about thirty (30) seconds.

The data packets 356 are sent from the encoder 102 to the media server 104 at block 456. If an error occurs ("Yes" branch block 458), the process terminates. If no error occurs ("No" branch, block 458) then the encoder 102 monitors when the amount of data specified in the Content-Length (approximately one minute of data) is streamed. As long as that amount of data packets 356 has not been streamed ("No" branch, block 460) then more data packets will continue to be streamed at block 456 and the process will repeat.

If the specified amount of data has been sent, or is approaching ("Yes" branch, block 460), then the encoder 102 sends a padding packet ("$F") at block 462 to fill up any remaining unused portion of the Content-Length amount. If the media server 104 acknowledges the conclusion of the streaming session by sending a new "push-id" ("Yes" branch, block 464) then a new "push start" is send at block 454 and the process begins anew from that point.

Once the encoder 102 has completed the "POST" request, proxy servers 108 will either forward the HTTP error response that the media server 104 had sent earlier, or they may not send a response at all. The encoder 102 will wait for the response for up to ten (10) seconds. if the response has not been received by this time, the encoder 102 will conclude that the media server 104 failed the streaming session and that the proxy server 108 discarded the error response.

If no acknowledgement is received ("No" branch, block 464) and approximately ten (10) seconds has not elapsed ("No" branch, block 466) then the acknowledgement is looked for again at block 464. If no acknowledgement is received and approximately ten (10) seconds has elapsed ("Yes" branch, block 466), then an error has occurred but has not been forwarded from the proxy server 108. An error message is generated at block 468 and the process terminates.

It is noted that a smaller value for the Content-Length header increases the overhead of the streaming media session. Each new HTTP "POST" request and each padding, packet cost overhead, i.e. wasted network resources. Therefore, the smaller Content-Length is only used when the encoder 102 detects that a proxy server 108 (or firewall) is present.

Exemplary Encoder-Server Communication

Figure 5:
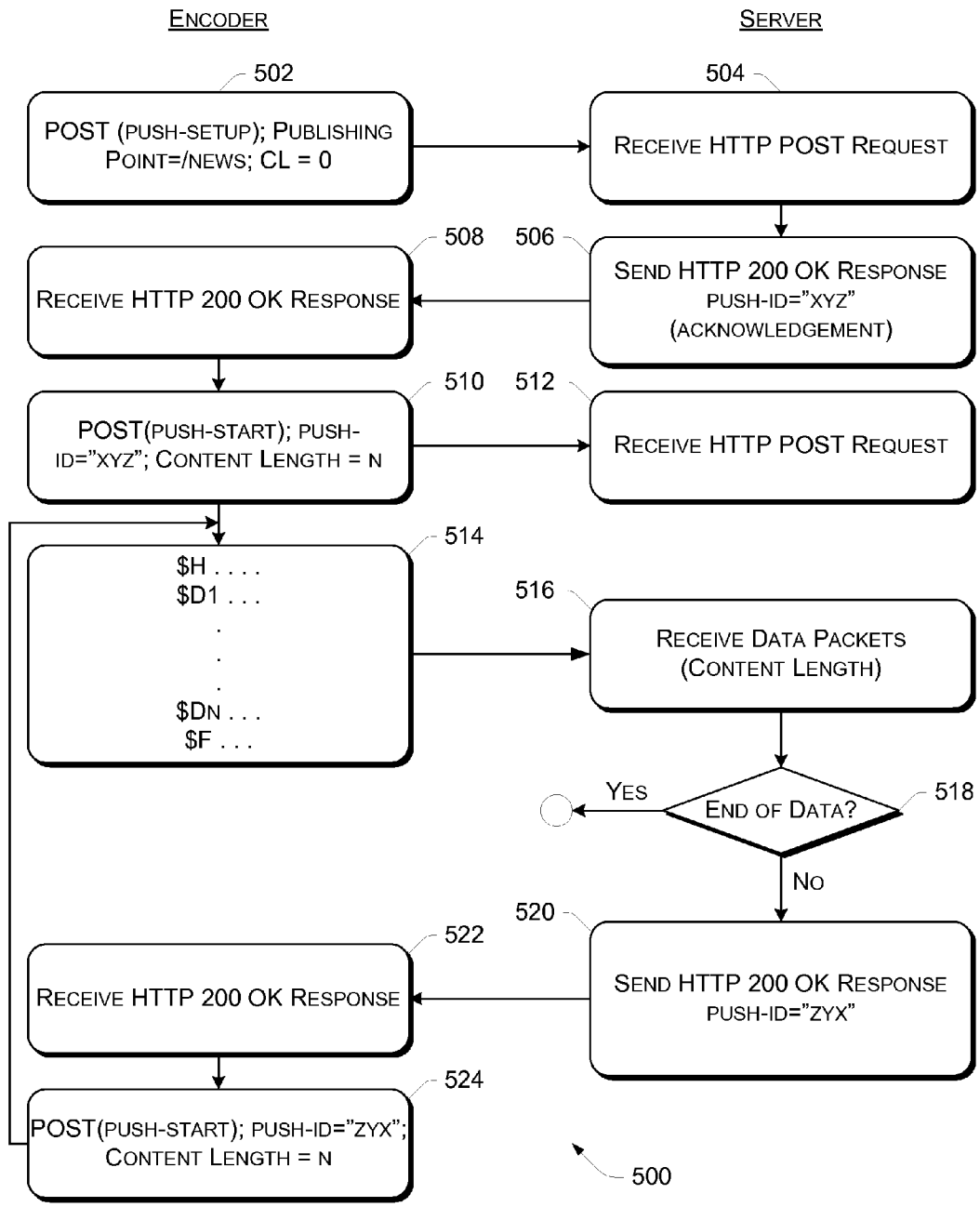
FIG. 5 is a flowchart illustrating exemplary communications between a client encoder and a server.

FIG. 5 is a flowchart 500 illustrating exemplary communications between a client encoder and a server. Such communications were previously discussed in the regard to FIG. 4a and FIG. 4b, but the flowchart 500 provides a more specific example of a typical communication session between the encoder 102 and the media server 104.

At block 502, the encoder 102 initiates a streaming session with the media server 104 by sending an HTTP "POST" request. Specifically, a "push-setup" request is sent that identifies a publishing point as a URL and a Content-Length of zero (0). The media server 104 receives the "push-setup" at block 504 and, in response, transmits an HTTP "200 OK" response with a "push-id" of "xyz" (block 506).

The server acknowledgement is received by the encoder 102 at block 508. In response, at block 510, the encoder 104 sends a second "POST", namely a "push-start" request that includes the "push-id" received from the media server 104 (i.e. "xyz"). A Content-Length—designated as N—is included in the "push-start" request. If there is a proxy server present in the network communication channel, N is equal to about one minute's amount of data. If no proxy server or firewall is present, then N=2,147,483,647. The media server 104 receives the "push-start" request at block 512.

At block 514, the encoder 102 begins streaming the data to the media server 104. The streaming data is received by the media server 104 at block 516 for the length specified in the Content-Length. If the data is terminated before the Content-Length amount is used ("Yes" branch, block 518), then the streaming session ends.

If the data streams for the amount specified in the Content-Length ("No" branch, block 518) then the media server 104 sends a "200 OK" message to the encoder 102 at block 520. The "200 OK" message includes a news "push-id" (e.g. "zyx").

At block 522, the encoder receives the new "push-id" and uses the new value to formulate a new "push-start" request at block 524. The "push-start" request is similar to the previous "push-start" request in that it contains the same Content-Length value. However, the "push-id" is different from the previous "push-start" message.

The process reverts back to block 514, where data packets continue to be streamed to the media server 104. The process continues until the data has all been streamed to the media server 104.

It is noted that the example described above assumes no errors in the transmission. Furthermore, on each subsequent pass through the blocks shown, the server response at block 520 will contain a different "push-id".

Figure 6:
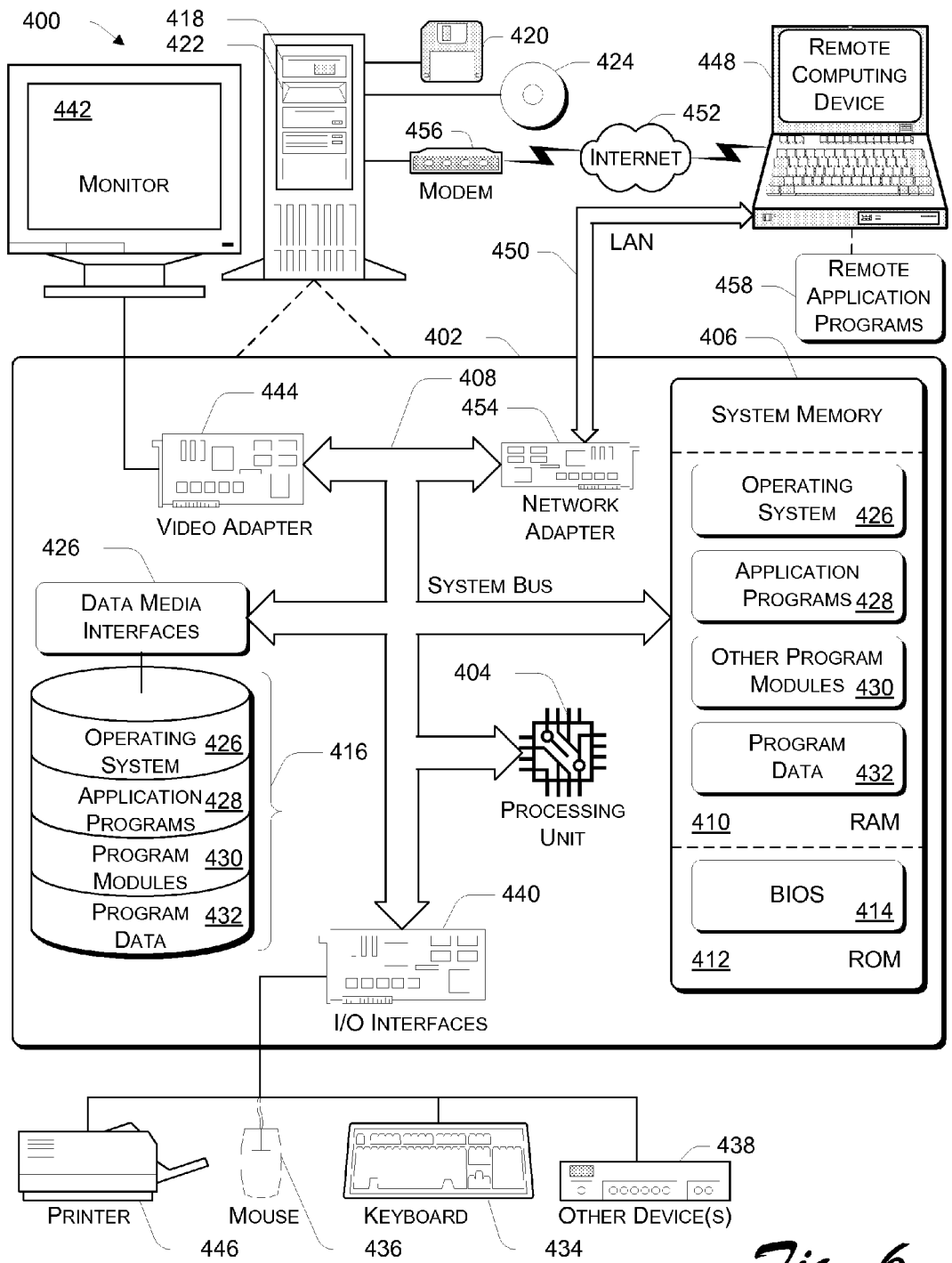
FIG. 6 illustrates a general computer environment, which can be used to implement the techniques described herein.

FIG. 6 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

Computer environment 600 includes a general-purpose computing device in the form of a computer 602. Computer 602 can be, for example, an encoder/client 102 or media server 104 of FIG. 1. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 aid includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/noon-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, nonvolatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g. a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 448 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

The techniques described herein thus allow data to be streamed from a client device to a server device using HTTP. This allows streaming media to traverse firewalls and or proxy servers set up to protect servers to which a client device is streaming data.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. An encoder computing device, comprising:
   a computer processor that executes computer executable instructions;
   one or more computer storage media storing:
      a multimedia content file containing multimedia;
      computer executable instructions that when executed by the computer processor provide a streaming module configured to:
         initiate a streaming session with a server using HyperText Transfer Protocol (HTTP) to identify a specific amount of multimedia content to be streamed to the server from the multimedia content file;
         determine if a firewall or proxy server receives the streaming data prior to the server receiving the streaming data;
         when no firewall or proxy server receives the streaming data prior to the server, the specific amount of multimedia content to be streamed to the server further comprises a maximum allowable amount of multimedia content that can be identified in the streaming session and be accepted by the server;
         when a firewall or proxy server receives the streaming data prior to the server, the specific amount of multimedia content to be streamed to the server further comprises an amount of multimedia content that the encoder can stream to the server in approximately one minute; and
         wherein the amount of multimedia content to be streamed cannot be determined prior to initiating the streaming session.

2. The encoder computing device as recited in claim 1, further embodied in a client computing device.

3. The encoder computing device as recited in claim 1, wherein the streaming module is further configured to receive a push identifier from the server after the amount of multimedia content specified has been streamed to the server and to initiate a continuing streaming session using the push identifier and specifying another amount of multimedia content that will be streamed to the server in the continuing streaming session.

4. The encoder computing device as recited in claim 3, wherein the amount of multimedia content specified to be streamed to the server in the continuing streaming session is equal to the amount of multimedia content specified to be streamed to the server in the previous streaming session.

5. The encoder computing device as recited in claim 1, wherein the streaming module is further configured to terminate the streaming session if no more multimedia content is available to stream, regardless of the specific amount of multimedia data that was specified to be streamed to the server.

6. The encoder computing device as recited in claim 1, wherein the streaming module is further configured to detect when a proxy server or firewall fails the streaming session even if no indication of error is received from the proxy server or firewall or the server.

7. The encoder computing device as recited in claim 6, wherein the detection further comprises detecting when an acknowledgement is not received from the server within ten (10) seconds after the amount of data that was specified to be streamed to the server has been streamed to the server.

8. An encoder computing device, comprising:
a computer processor that executes computer executable instructions;
one or more computer storage media storing:
a multimedia content file containing multimedia;
computer executable instructions that when executed by the computer processor provide a streaming module configured to:
initiate a HyperText Transfer Protocol (HTTP) streaming session with a server to stream an uncertain amount of multimedia content data from the multimedia content file to the server;
detect the presence of a firewall or proxy server for the HTTP streaming session with the server;
set a specific multimedia content length value based on whether a firewall or proxy server has been detected for the HTTP streaming session with the server, wherein in the event that no firewall or proxy server is detected, the multimedia content length value is specified to be a maximum amount of multimedia content data that may be streamed to the server;
receive a server acknowledgement containing a push identifier;
transmit a header to begin streaming the multimedia content data to the server, the header including the push identifier and denoting the specific multimedia content length value; and
stream the multimedia content data to the server.

9. The encoder computing device as recited in claim 8, wherein in the event that a firewall or proxy server is detected, the multimedia content length value is set to an amount of multimedia content data that the encoder can stream to the server in approximately one minute.

10. The encoder computing device as recited in claim 8, wherein the streaming module is further configured to:
receive a push identifier from the server after the amount of multimedia content data specified by the multimedia content length value has been streamed to the server;
initiate a continuing streaming session using the push identifier; and
set another multimedia content length value specifying an amount of multimedia content data that will be streamed to the server in the continuing streaming session.

11. The encoder computing device as recited in claim 8, wherein the amount of multimedia content data specified to be streamed to the server in the continuing streaming session is equal to the amount of multimedia content data specified by the multimedia content length value in the previous streaming session.

12. The encoder computing device as recited in claim 8, wherein the streaming module is further configured to detect when a proxy server or firewall fails the streaming session even if no indication of error is received from the proxy server or firewall or the server.

13. The encoder computing device as recited in claim 12, wherein the detection further comprises detecting when an acknowledgement is not received from the server within ten (10) seconds after the amount of multimedia content data that was specified to be streamed to the server has been streamed to the server.

14. An encoder computing device, comprising:
a computer processor that executes computer executable instructions;
one or more computer storage media storing:
a multimedia content file containing multimedia;
computer executable instructions that when executed by the computer processor provide a streaming module configured to:
initiate a streaming session with a server using HyperText Transfer Protocol (HTTP) to identify a specific amount of multimedia content to be streamed to the server, wherein the amount of multimedia content to be streamed cannot be determined prior to initiating the streaming session;
determine if a firewall or proxy server receives the streaming data prior to the server receiving the streaming data, wherein in the event that no firewall or proxy server receives the streaming data prior to the server, the specific amount of multimedia content to be streamed to the server is specified to be a maximum allowable amount of multimedia content that can be identified in a streaming session and be accepted by the server; and
transmit a header to begin streaming the multimedia content data to the server, the header including the push identifier and denoting the specific amount of multimedia content to be streamed to the server;
stream the multimedia content data to the server.

15. The encoder computing device as recited in claim 14, wherein the streaming module is further configured to receive a push identifier from the server after the amount of multimedia content specified has been streamed to the server and to initiate a continuing streaming session rising the push identifier and specifying another amount of multimedia content that will be streamed to the server in the continuing streaming session.

16. The encoder computing device as recited in claim 15, wherein the amount of multimedia content specified to be streamed to the server in the continuing streaming session is equal to the amount of multimedia content specified to be streamed to the server in the previous streaming session.

17. The encoder computing device as recited in claim 14, wherein the streaming module is further configured to detect when a proxy server or firewall fails the streaming session even if no indication of error is received from the proxy server or firewall or the server, wherein the detection further comprises detecting when an acknowledgement is not received from the server within ten (10) seconds after the amount of data that was specified to be streamed to the server has been streamed to the server.

* * * * *